United States Patent
Singhal

(10) Patent No.: US 10,735,408 B2
(45) Date of Patent: Aug. 4, 2020

(54) APPLICATION CONNECTION FOR DEVICES IN A NETWORK

(71) Applicant: SAMSUNG ELECTRONICS CO., LTD., Suwon, Gyeonggi-do (KR)

(72) Inventor: Ashish Singhal, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 13/803,673

(22) Filed: Mar. 14, 2013

(65) Prior Publication Data

US 2014/0282924 A1    Sep. 18, 2014

(51) Int. Cl.
*H04L 29/06* (2006.01)

(52) U.S. Cl.
CPC .................. *H04L 63/0853* (2013.01)

(58) Field of Classification Search
CPC ....... H04L 63/0853; H04L 63/08; H04L 9/32; H04L 63/104; H04N 9/04; H04N 5/225; G06F 9/445; G06F 15/177; G06F 17/00; G06F 8/61; H04W 12/08; H04W 4/50; H04W 12/003
See application file for complete search history.

(56) References Cited

U.S. PATENT DOCUMENTS

| | | | |
|---|---|---|---|
| 8,251,290 B1 * | 8/2012 | Bushman et al. | 235/462.01 |
| 8,627,438 B1 * | 1/2014 | Bhimanaik | 726/9 |
| 8,823,494 B1 * | 9/2014 | Kovitz et al. | 340/10.1 |
| 8,831,224 B2 | 9/2014 | Bai | |
| 8,842,310 B2 * | 9/2014 | Tredoux et al. | 358/1.14 |
| 8,909,247 B2 | 12/2014 | Tipton et al. | |
| 8,930,694 B2 | 1/2015 | Fernandez de Torres et al. | |
| 9,191,975 B2 | 11/2015 | Barathalwar et al. | |
| 9,241,239 B2 | 1/2016 | Manroa et al. | |
| 9,253,811 B2 | 2/2016 | Kotecha | |
| 9,276,921 B2 | 3/2016 | Birkler | |
| 9,363,661 B2 | 6/2016 | Chan | |
| 9,377,876 B2 | 6/2016 | Ramagem | |
| 9,479,345 B2 | 10/2016 | Krishnakumar | |

(Continued)

FOREIGN PATENT DOCUMENTS

| | | |
|---|---|---|
| CN | 101952817 A | 1/2011 |
| CN | 101960824 A | 1/2011 |

(Continued)

OTHER PUBLICATIONS

Lightner, R., "How to share your Wi-Fi access with a QR code", Jul. 8, 2011, pp. 1-6, CNET How To, CBS Interactive, United States.*

(Continued)

*Primary Examiner* — Thanhnga B Truong
(74) *Attorney, Agent, or Firm* — Sherman IP LLP; Kenneth L. Sherman; Steven Laut

(57) ABSTRACT

A method for application connection comprises discovering information for communicating with a first electronic device. The first electronic device includes an application launched thereon. A symbolic code representing the discovered information is generated. The symbolic code is displayed on a display device. The symbolic code is used to gain access to the first electronic device via a second electronic device. The application is connected via the second electronic device.

26 Claims, 9 Drawing Sheets

(56) References Cited

U.S. PATENT DOCUMENTS

| | | | |
|---|---|---|---|
| 9,578,495 | B2 | 2/2017 | Xiang et al. |
| 9,654,970 | B2 | 5/2017 | Yoon et al. |
| 2004/0225716 | A1 | 11/2004 | Shamir et al. |
| 2007/0160004 | A1 | 7/2007 | Sakhpara |
| 2009/0210802 | A1 | 8/2009 | Hawkins et al. |
| 2009/0216846 | A1 | 8/2009 | Burroughs et al. |
| 2009/0313705 | A1* | 12/2009 | Adams et al. .................. 726/30 |
| 2011/0150266 | A1* | 6/2011 | Hohndel ........................ 382/100 |
| 2011/0219427 | A1* | 9/2011 | Hito ........................ G06F 21/00 726/3 |
| 2012/0066373 | A1 | 3/2012 | Ochoa et al. |
| 2012/0158919 | A1* | 6/2012 | Aggarwal ............ H04L 63/104 709/220 |
| 2012/0226813 | A1* | 9/2012 | Ragusa et al. ................. 709/227 |
| 2012/0252405 | A1* | 10/2012 | Lortz et al. .................... 455/410 |
| 2012/0254965 | A1* | 10/2012 | Parker ................................ 726/7 |
| 2012/0268553 | A1 | 10/2012 | Talukder |
| 2012/0272147 | A1* | 10/2012 | Strober ........................ 715/716 |
| 2012/0311165 | A1 | 12/2012 | Renschler |
| 2013/0016710 | A1* | 1/2013 | Shinohara ..................... 370/338 |
| 2013/0023339 | A1 | 1/2013 | Davis et al. |
| 2013/0111208 | A1* | 5/2013 | Sabin et al. .................. 713/171 |
| 2013/0124740 | A1* | 5/2013 | Liansky et al. ............... 709/224 |
| 2013/0125212 | A1* | 5/2013 | Lee ................................. 726/4 |
| 2013/0219479 | A1* | 8/2013 | DeSoto ................ H04W 12/06 726/6 |
| 2013/0247226 | A1* | 9/2013 | Sebes et al. ..................... 726/29 |
| 2013/0250358 | A1* | 9/2013 | Suzuki ......................... 358/1.15 |
| 2013/0254519 | A1* | 9/2013 | Benoit et al. ..................... 713/1 |
| 2013/0262873 | A1* | 10/2013 | Read et al. ..................... 713/186 |
| 2013/0304820 | A1* | 11/2013 | Vasquez et al. .............. 709/204 |
| 2014/0007211 | A1* | 1/2014 | Yang et al. ........................ 726/7 |
| 2014/0045472 | A1* | 2/2014 | Sharma .................. H04W 4/08 455/416 |
| 2014/0047524 | A1* | 2/2014 | Auger ................................ 726/7 |
| 2014/0056171 | A1* | 2/2014 | Clegg ............................ 370/254 |
| 2014/0068727 | A1* | 3/2014 | Shamis et al. .................... 726/5 |
| 2014/0098952 | A1* | 4/2014 | Ikeda ............................... 380/31 |
| 2014/0115708 | A1* | 4/2014 | Terwilliger et al. ............ 726/26 |
| 2014/0122884 | A1* | 5/2014 | Pieczul et al. ................. 713/171 |
| 2014/0187149 | A1 | 7/2014 | Lortz et al. |
| 2014/0188990 | A1 | 7/2014 | Fulks |
| 2014/0196023 | A1* | 7/2014 | Bouthillier et al. .......... 717/178 |
| 2014/0245388 | A1* | 8/2014 | Nako .................. H04L 63/0853 726/3 |
| 2014/0280981 | A1 | 9/2014 | Singhal |
| 2014/0281522 | A1* | 9/2014 | Bortnem et al. .............. 713/168 |
| 2014/0298021 | A1* | 10/2014 | Kwon et al. .................. 713/168 |
| 2014/0304780 | A1* | 10/2014 | Kuang et al. ..................... 726/4 |
| 2015/0047000 | A1* | 2/2015 | Spencer, III ........ H04L 63/0876 726/7 |
| 2015/0089610 | A1* | 3/2015 | DeSoto ................ H04W 12/06 726/6 |
| 2019/0222654 | A1 | 7/2019 | Singhal |

FOREIGN PATENT DOCUMENTS

| | | |
|---|---|---|
| CN | 102725747 A | 10/2012 |
| WO | 2012135563 A1 | 10/2012 |

OTHER PUBLICATIONS

Extended European Search Report dated Sep. 9, 2014 for European Application No. 13198163.1 from European Office, pp. 1-12, Munich, Germany.

Lightner, R., "How to share your Wi-Fi acess with a QR code", Jul. 8, 2011, pp. 1-6, CNET How to, CBS Ineractive, United States.

Katta, S., "Quick Tip: A QR Code to Share Wifi Passwords with Android", Jan. 11, 2011, pp. 1-3, Skatter.com, United States.

Partial European Search Report dated May 27, 2014 for European Application No. 13198163.1 from European Patent Office, pp. 1-5, Munich, Germany.

U.S. Restriction Requirement for U.S. Appl. No. 13/803,723 dated Feb. 2, 2015.

U.S. Non-Final Office Action for U.S. Appl. No. 13/803,723 dated May 5, 2015.

U.S. Final Office Action for U.S. Appl. No. 13/803,723 dated Nov. 5, 2015.

U.S. Advisory Action for U.S. Appl. No. 13/803,723 dated Feb. 16, 2016.

U.S. Non Final Office Action for U.S. Appl. No. 13/803,723 dated Apr. 8, 2016.

U.S. Advisory Action for U.S. Appl. No. 13/803,723 Jan. 11, 2017.

U.S. Final Office Action for U.S. Appl. No. 13/803,723 dated Oct. 13, 2016.

U.S. Final Office Action for U.S. Appl. No. 13/803,723 dated Oct. 12, 2017.

U.S. Non-Final Office Action for U.S. Appl. No. 13/803,723 dated Mar. 21, 2017.

European Examination Report dated Nov. 20, 2017 for European Application No. 13198163.1 from European Patent Office, pp. 1-8, Berlin, Germany U.S. Advisory Action for U.S. Appl. No. 13/803,723 dated Jan. 17, 2018.

Chinese Office Action dated Mar. 7, 2018 for Chinese Patent Application No. 201410035153.X from Chinese Patent Office, pp. 1-16, Beijing, China (English-language translation included pp. 1-9).

U.S. Non-Final Office Action for U.S. Appl. No. 13/803,723 dated May 2, 2018.

U.S. Notice of Allowance for U.S. Appl. No. 13/803,723 dated Dec. 28, 2018.

Chinese Office Action dated Oct. 16, 2018 for Chinese Patent Application No. 201410035153.X from Chinese Patent Office, pp. 1-19, Beijing, China (English-language translation included pp. 1-10).

European Office Action dated Aug. 17, 2018 for European Patent Application No. 13198163.1 from European Patent Office, pp. 1-9, Berlin, Germany.

U.S. Non-Final Office Action for U.S. Appl. No. 16/363,325 dated Oct. 10, 2019.

U.S. Final Office Action for U.S. Appl. No. 16/363,325 dated Apr. 20, 2020.

U.S. Advisory Action for U.S. Appl. No. 16/363,325 dated Jun. 19, 2020.

* cited by examiner

APPLICATION CONNECTION FOR DEVICES IN A NETWORK

TECHNICAL FIELD

One or more embodiments relate generally to applications in a network environment and, in particular, to application connection by devices in a network.

BACKGROUND

Wireless networks use passwords to prevent access to devices and content within the network for security. In order for guests to access a secure wireless network with their devices, the guest devices are required to pair to the wireless network for discovery. In order for pairing to occur, the password for the wireless network has to be given to the guests, which poses a security risk as well as an inconvenience.

SUMMARY

In one embodiment, a method provides for application connection. One embodiment comprises discovering information for communicating with a first electronic device. The first electronic device includes an application launched thereon. In one embodiment, a symbolic code representing the discovered information is generated. The symbolic code is displayed on a display device. In one embodiment, the symbolic code is used to gain access to the first electronic device via a second electronic device. The application is connected via the second electronic device.

Another embodiment provides a method for application connection. One embodiment comprises launching a first application in a secured environment. Identification content based on information obtained by the first application is generated. At least a portion of the identification content is obtained by a first electronic device. The portion of the identification content is used by the first electronic device to connect to the first application by the first electronic device.

One embodiment provides a system for application connection. In one embodiment, a first electronic device executes a first application for generating identification content based on network information. In one embodiment, a second electronic device obtains the identification content, uses at least a portion of the identification content to gain access to the network, and connects to the first application.

Another embodiment provides a non-transitory computer-readable medium having instructions which when executed on a computer perform a method comprising: launching a first application in a secured network. Identification content is generated based on information obtained by the first application. At least a portion of the identification content is obtained by a first electronic device. The portion of the identification content is used by the first electronic device to connect to the first application by the first electronic device.

These and other aspects and advantages of the embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to network application sharing. One embodiment provides connection to an application launched within a network by electronic devices.

In one embodiment, the electronic devices comprise one or more mobile electronic devices capable of data communication over a communication link such as a wireless communication link. Examples of such mobile device include a mobile phone device, a mobile tablet device, etc. In one embodiment, a method provides for application connection. One embodiment comprises discovering information for communicating with a first electronic device. The first electronic device includes an application launched thereon. In one embodiment, a symbolic code representing the discovered information is generated. The symbolic code is displayed on a display device. In one embodiment, the symbolic code is used to gain access to the first electronic device via a second electronic device. The application is connected via the second electronic device.

Figure 1:
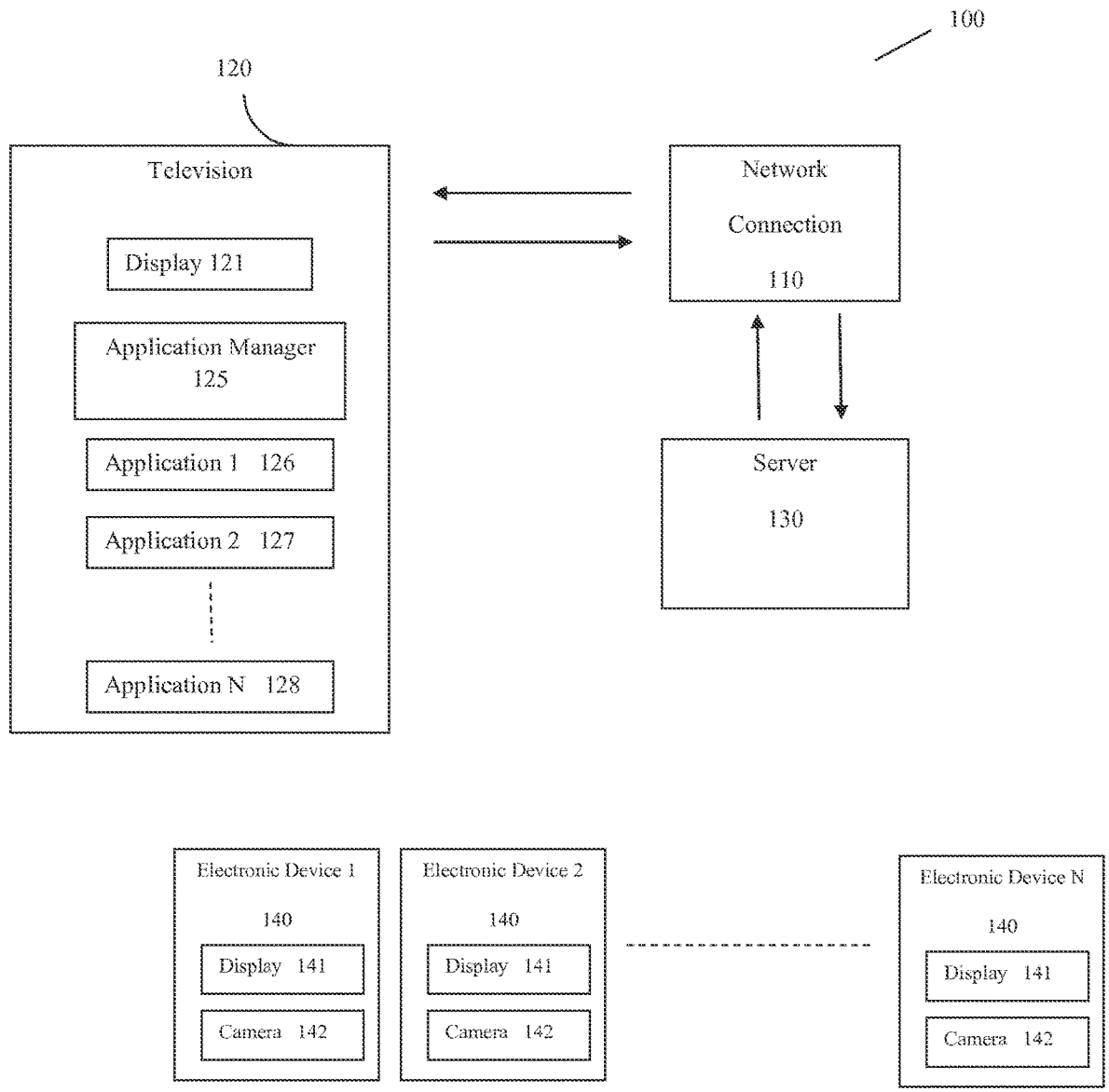
FIG. 1 shows a block diagram of an architecture system for application connection in a network, according to an embodiment.

FIG. 1 shows a functional block diagram of an embodiment of an architecture system 100 for application connection in a network by electronic devices 1-N 140 (N being a positive integer), according to an embodiment. In one embodiment, the system 100 comprises a television device 120, a server device 130, and network connection device 110. In one embodiment, the television device comprises a display 121, and an application manager module 125 for managing applications, such as application 1 126, application 2 127 up to application N 128 (N being a positive integer).

In one embodiment, the display 121 may be a separate device from the television device 120 or integrated with the television device 120. In one embodiment, the network connection device 110 may comprise a network interface, such as a network modem, router, etc. for handling communications between the television device and the server device 130 and for forming a local network with which the television device 120 may be connected.

In one embodiment, the electronic devices 1-N 140 may comprise mobile devices that may utilize mobile device hardware functionality including: a display 141, a camera 142, a global positioning satellite (GPS) receiver module, a compass module, and an accelerometer and gyroscope module. The camera module is used to capture images of surroundings. The GPS module is used to identify a current location of the mobile device (i.e., user). The compass module is used to identify direction of the mobile device. The accelerometer and gyroscope module is used to identify tilt of the mobile device.

The system 100 provides the electronic devices 1-N 140 the ability to connect to an application launched on the television device 120, such as application 1 126, application 2 127 to application N 128. In one embodiment, the application 1 126, application 2 127 to application N 128 may comprise software applications executing on the television device 120 or executing on another device and having a visual display portion of the application shown on the display 121.

In one embodiment, the local network (e.g., a wireless network) that the television device 120 is connected to is a secured network with a security code (e.g., pass code, password, key code, etc.) providing access to the local network such that without having knowledge of the key code, the electronic devices 1-N 140 cannot pair or join the local network. In one embodiment, access is provided to the electronic devices 1-N 140 to the local network that the application is launched by means for connecting, such as by obtaining information from extracting information from a unique symbol (e.g., a quick response (QR) code), etc. In one embodiment, once an electronic device is connected to the local network, the connection has a limited life for security purposes (e.g., one hour, two hours, 4 hours, etc.). In one embodiment, the security code is unique for each session.

In one embodiment, the timestamp and time to live value retrieved (e.g., from a QR code) are used by an application on an electronic device 1-N 140 to determine when to disconnect from the network. In this embodiment, the network information is time bound and the usage of the same information (e.g., same QR code) is restricted after the timestamp has expired.

In one embodiment, after an electronic device 1-N 140 connects to an application (e.g., application 1 126) of the television device 120, the electronic device 1-N 140 is disconnected from the network if it moves out of the wireless range of the network. In this case, the network information or QR code would have to be obtained again by the electronic device 1-N 140 (e.g., QR code scanned again) in order to re-establish the connection. In one embodiment, the QR code may either be obtained from the QR code displayed on display 121 or the QR code may be obtained from a display 141 on any other electronic device 1-N 140.

Figure 2:
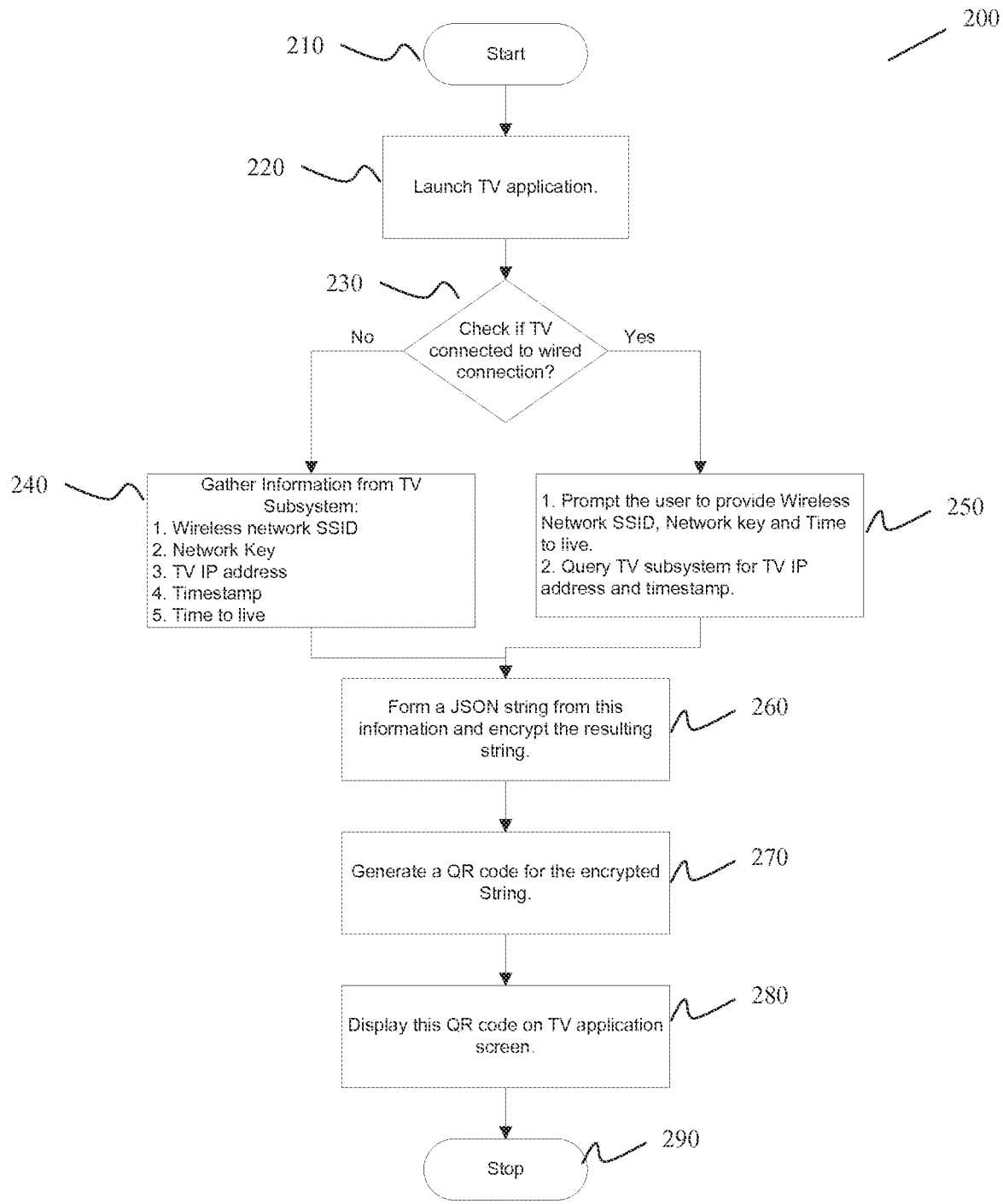
FIG. 2 shows an example flow chart for application connection in a network, according to an embodiment.

FIG. 2 shows an example flow chart process 200 for generating a QR code for display that includes information for network pairing and application connection in a network, according to an embodiment. In one embodiment, the process 200 starts with block 210, where the process for generating a QR code for display that includes information for network pairing and an application connection in a network for connecting to an application launched on a television device 120 starts up, such as by selecting an application on the display 121 of the television device 120 by using a device such as a remote control, pointing device, voice command, using an application executing on a smart phone or tablet device, etc. In block 220 an application is launched, for example on a television device 120 in a local network (e.g., a home network).

In one embodiment, in block 230 it is determined whether a television device is connected to a wired or wireless network connection. If it is determined that the television device is connected to a wired connection, process 200 continues to block 250; otherwise, process 200 continues to block 240. In one embodiment, in block 240, information is gathered from the television device where the information may comprise a wireless network service set identification (SSID), network key, a television device's internet protocol (IP) address, a timestamp, and time to live (i.e., application connection time limit for a mobile electronic device). In one embodiment, in block 250, a user is prompted on a display (e.g., display 121) connected with a television device (e.g., television device 120) to provide a wireless network SSID, network key, and time to live for an application to be connected by mobile electronic devices (e.g., electronic devices 1-N 140). After entering the prompted information, the television device or local network is queried for the television device's IP address and a timestamp. After either process block 240 or 250 are completed, the process 200 continues to process block 260.

In one embodiment, in block 260 a Java script object notation (JSON) string is formed from the information obtained in either block 240 or 250, and the resulting JSON string is encrypted (e.g., by known encryption techniques). Process 200 continues to block 270, where a QR code is generated for the encrypted string obtained from block 260. In block 280 the QR code provided on a display, such as display 121. Process 200 then stops in block 290.

Figure 3:
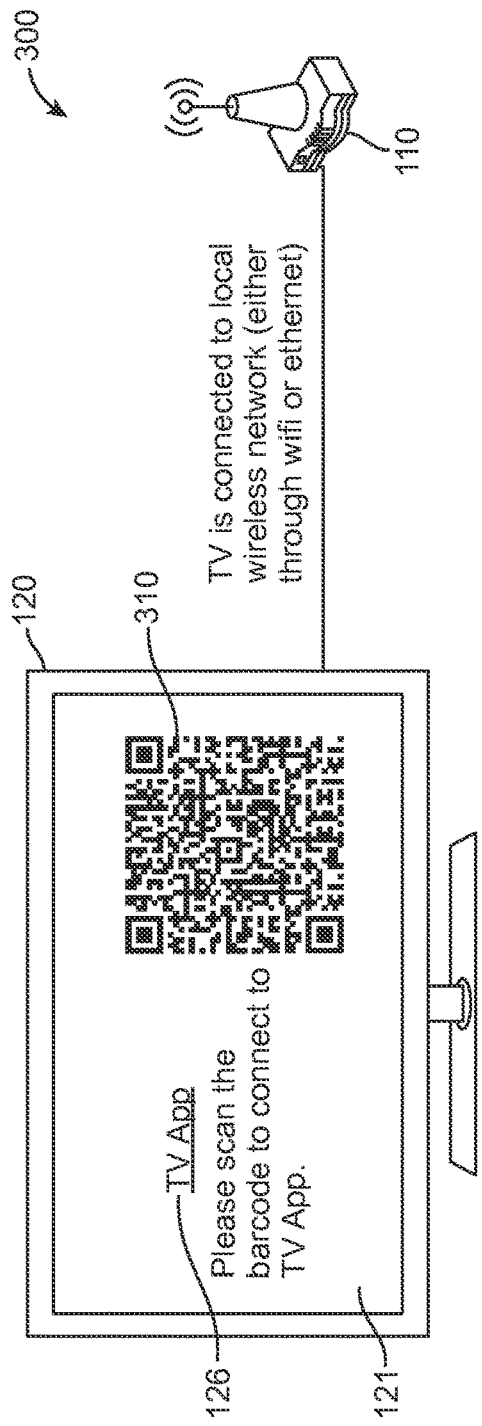
FIG. 3 shows an example scenario for application connection in a network, according to an embodiment.

FIG. 3 shows an example scenario 300 for application connection in a network of the television device 120, according to an embodiment. In one embodiment, the network connection 110 provides signals for the television device 120 to connect with a local network, either wirelessly (e.g., Wi-Fi) or wired (e.g., via Ethernet). On the display 121, an application 1 126 is shown as being launched and executing on the television device 120. A QR code 310 is displayed on the display 121, where the QR code 310 is generated from a process (e.g., process 200 of FIG. 2) for embedding information for connection to the application 1 126 in the local network to which the television device 120 is currently connected.

Figure 4:
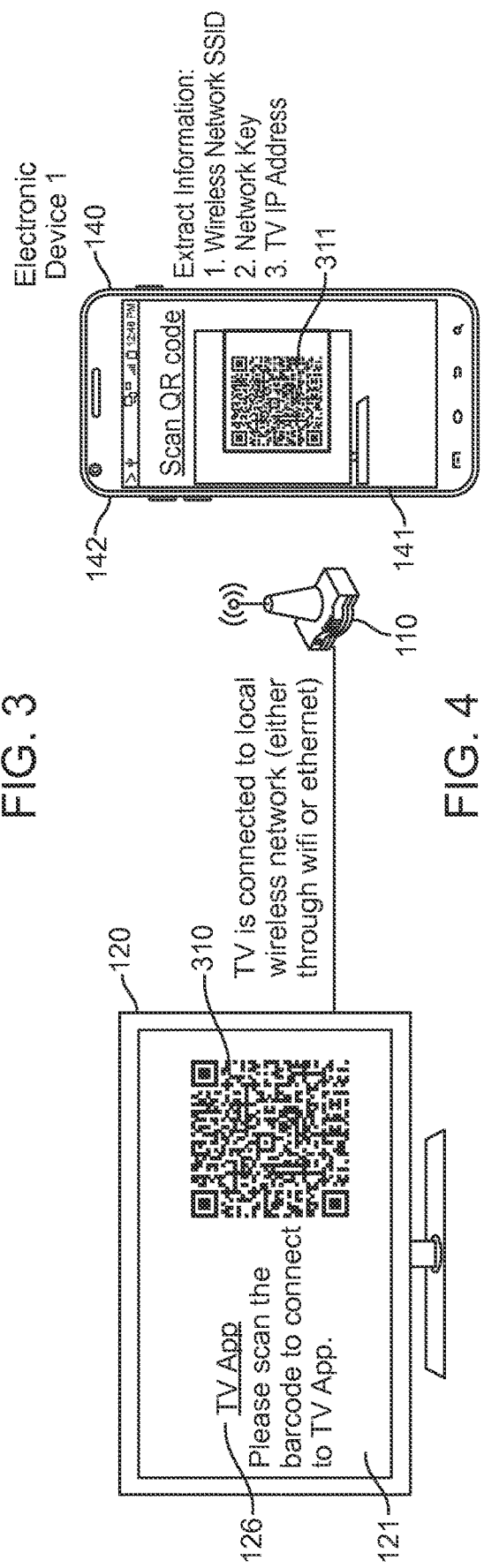
FIG. 4 shows another example scenario for application connection in a network, according to an embodiment.

FIG. 4 shows another example scenario for application connection in the network of the television device 120, according to an embodiment. In one embodiment, using the QR code 310 displayed on the display 121 in the local network, the electronic device 1 140 uses a camera 142 for capturing an image 311 of the QR code 310 as shown on the display 141 of the electronic device 1 140. The electronic device 1 140 then uses the image 311 of the QR code 310 to extract the information pertaining to the television device 120 and the local network (e.g., SSID, network key, television device's 120 IP address).

Figure 5:
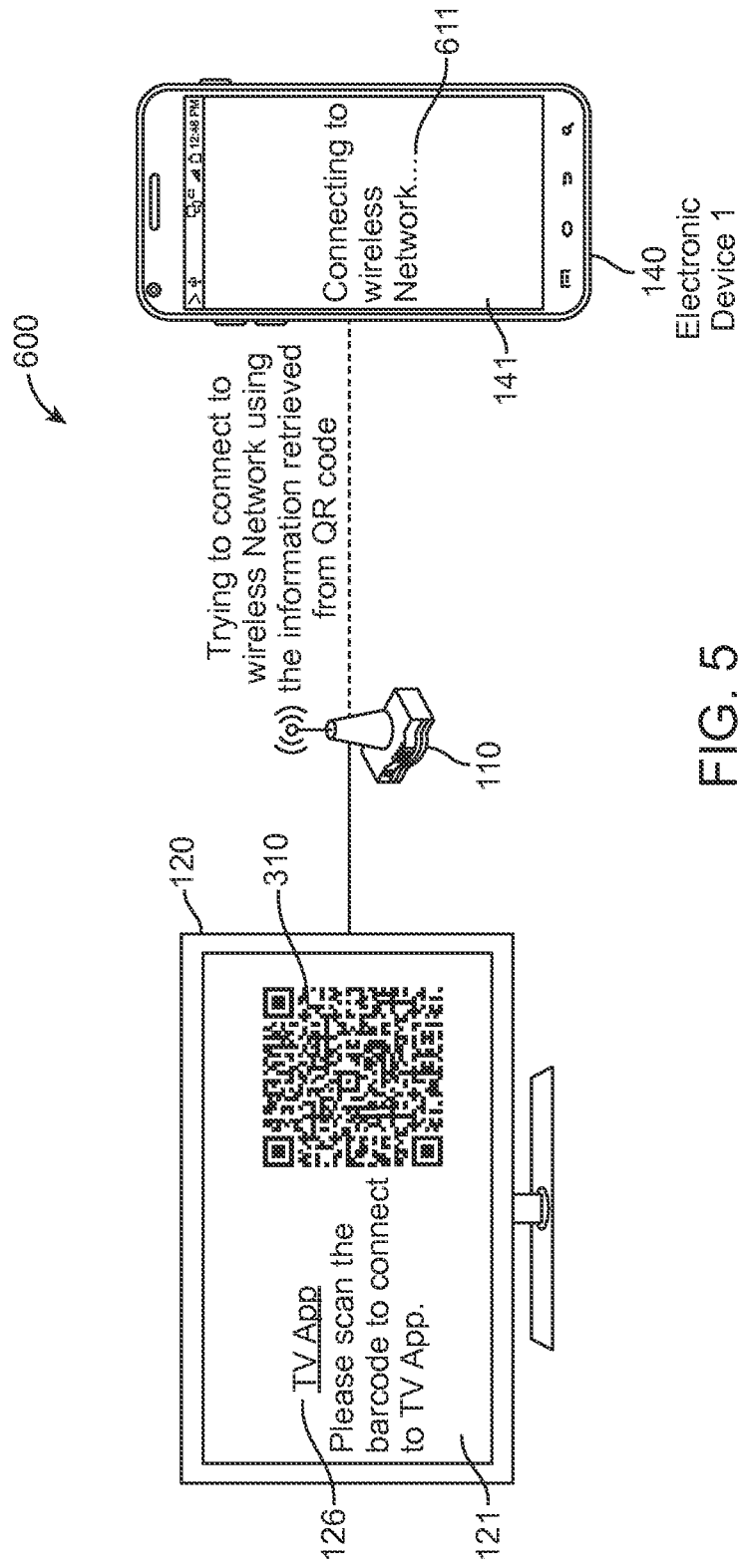
FIG. 5 shows another example scenario for application connection in a network, according to an embodiment.

FIG. 5 shows another example scenario 600 for application connection in the local network of the television device 120, according to an embodiment. In one embodiment, after the QR code 310 is captured as an image 311 on the electronic device 1 140 and the information pertaining to the local network is extracted, an application launched on the electronic device 1 140 uses the extracted information to connect to the network and then to connect to the application 1 126 and shows the status 611 on the display 141 for the electronic device 1 140 (e.g., "Connecting to Wireless Network . . . ").

Figure 6:
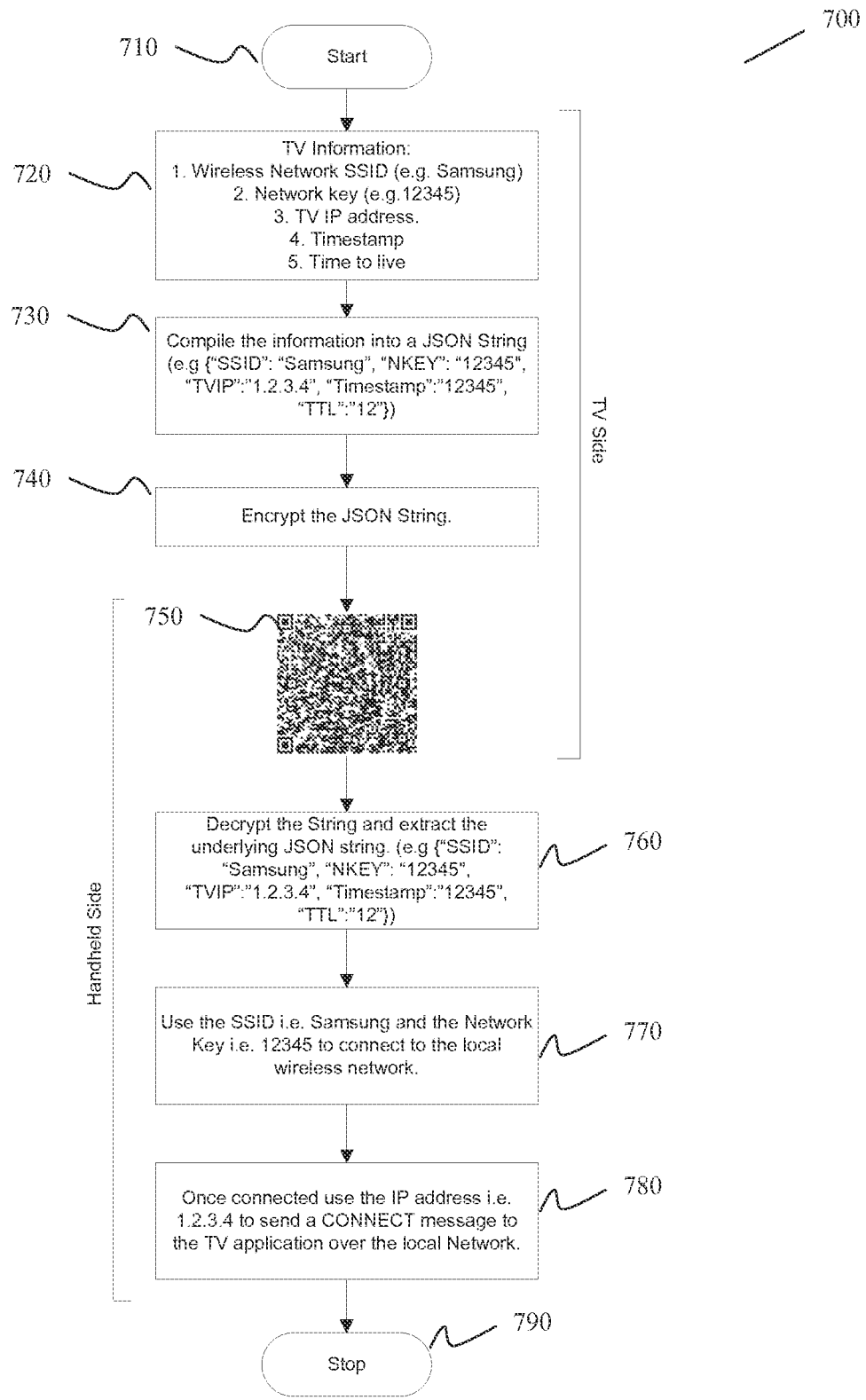
FIG. 6 shows another example flow chart for application connection in a network, according to an embodiment.

FIG. 6 shows an example flow chart process 700 for generating a QR code for display that includes information for network pairing and using the QR code for application connection in a network, according to an embodiment. In one embodiment, the process 700 starts with block 710 where the process for generating a QR code for display that includes information for network pairing and using the QR code for application connection in a network. In one embodiment, in block 720, information is obtained (e.g., as in blocks 240 or 250 in FIG. 2) that is related to the television device (e.g., television device 120 of FIG. 1), where the information may comprise a wireless network SSID, network key (e.g., a number (e.g., 12345), an alphanumeric code (e.g., ABC123), etc.), a television device's IP address, a timestamp, and time to live. In one embodiment, in block 730, a JSON string is formed from the compiled information obtained in block 720 (e.g., {"SSID": "Samsung," "NKEY": "12345," "TVIP": "1.2.3.4," "Timestamp": "12345," "TTL,": "12"}). In one embodiment, in block 740, the JSON string from block 730 is encrypted (e.g., by known encryption techniques).

Process 700 continues to block 750, where a QR code is generated for the encrypted string obtained from block 740 and displayed on a display (e.g., display 121). In one embodiment, in process block 750, an electronic device (e.g., electronic device 1 140) captures an image of the QR code using a camera. In block 760, the QR code is used to obtain the encrypted JSON string, and the encrypted JSON string is decrypted to obtain the JSON string (e.g., {"SSID": "Samsung," "NKEY": "12345," "TVIP": "1.2.3.4," "Timestamp": "12345," "TTL,": "12"}) and extract the information.

In one embodiment, in block 770, the SSID (e.g., "Samsung") and the network key (e.g., "NKEY": "12345") are used by the electronic device to connect to the local network that the application is being executed by the television device. In one embodiment, in block 780, once the electronic device is connected to the local network, the obtained IP address is used to send a "CONNECT" message to the application over the local network in order to connect to the application. In process block 790, process 700 then stops.

Figure 7:
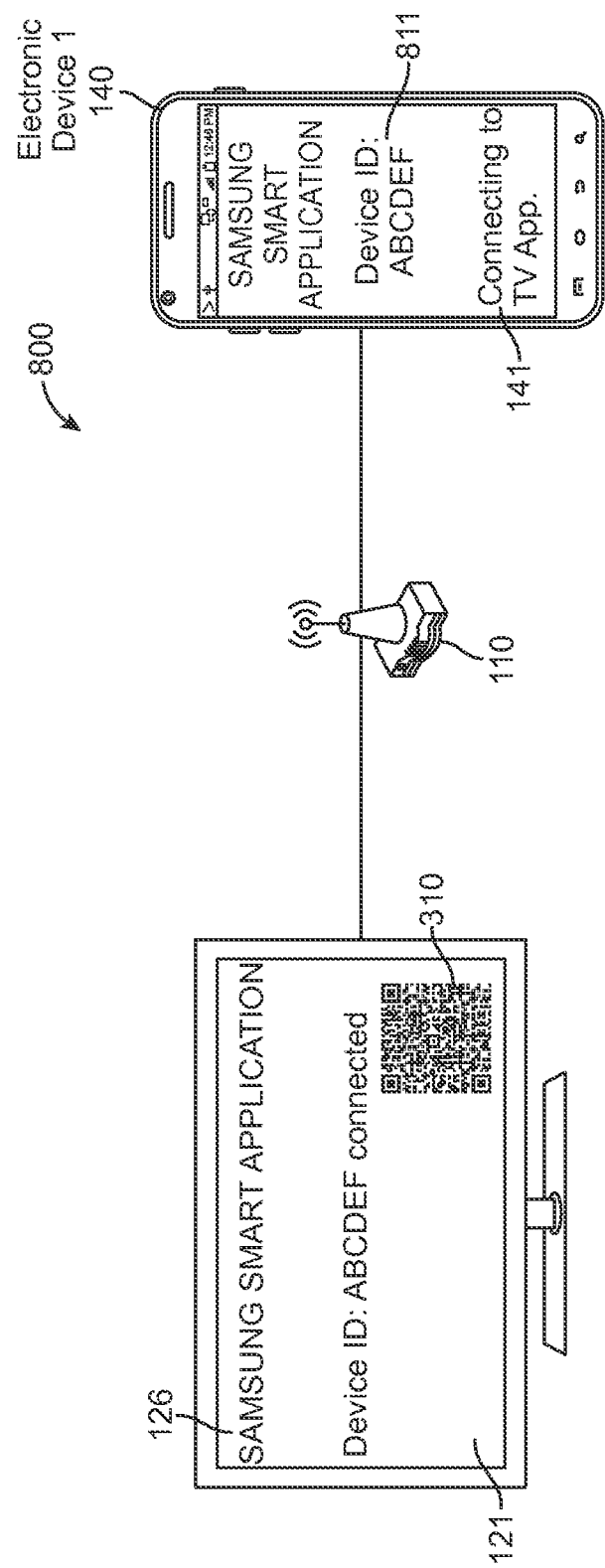
FIG. 7 shows an example scenario for application connection in a network, according to an embodiment.

FIG. 7 shows an example scenario 800 for application connection in a network, according to an embodiment. In one embodiment, as shown, the electronics device 1 140 has connected to the application 1 126 (executing on the television 120) over the network using the network connection device 110 by using the QR code 310 (e.g., by using processes 200 FIGS. 2 and 700 FIG. 6). In one embodiment, once the electronic device 1 140 is connected to the application 1 126, the display 141 shows the status as connected to the application 1 126 using an application that is executing on the electronic device 1 140. In one embodiment, the device identification (ID) and status 811 of the electronic device 1 140 is shown on the display 141, and a notification is shown on the display 121, showing the status of the device ID being connected.

Figure 8:
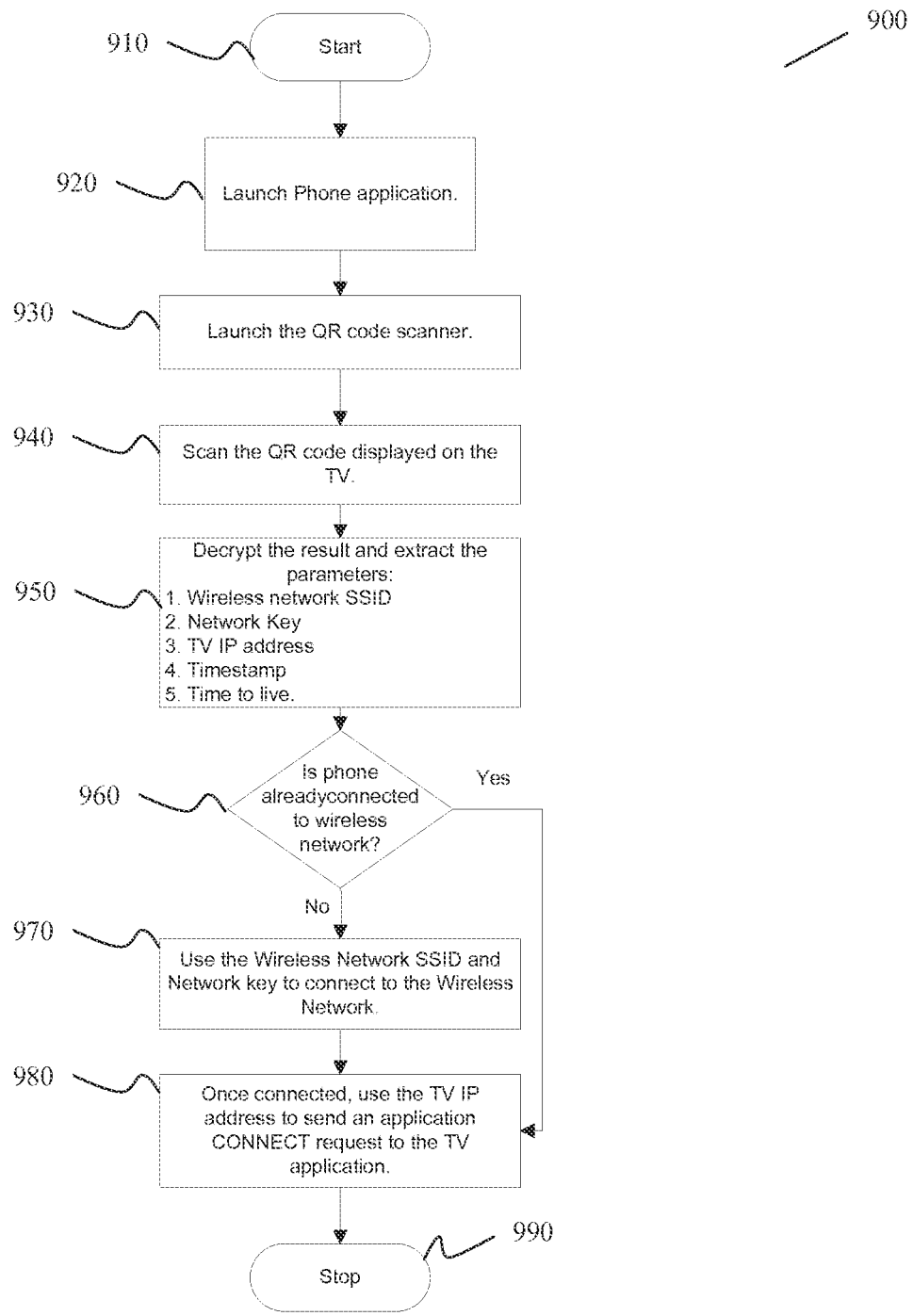
FIG. 8 shows an example flow chart for application connection in a network, according to an embodiment.

FIG. 8 shows an example flow chart process 900 for using a QR code displayed by a television device for application connection by a mobile electronic device (e.g., a cell phone device) in a network, according to an embodiment. In one embodiment, the process 900 starts with block 910 where the process for using the QR code for network pairing and for application connection in a network starts up. In one embodiment, the process 900 may begin by a user launching an application on the mobile electronic device (e.g., electronic device 1 140) by, e.g., tapping on a display screen, using a voice command, etc. In one embodiment, in block 920, once the application is selected for execution, the application launches (e.g., executes) on the mobile electronic device. In one embodiment, in block 930, a QR code scanner (e.g., application using a camera of the mobile electronic device) is launched.

In block 940, the QR code displayed on a display (e.g., display 121) of a television device (e.g., television device 120) is scanned using the mobile electronic device. In one embodiment, in block 950, the QR code is used for decrypting information that is related to the television device, where the information may comprise a wireless network SSID, network key (e.g., a number (e.g., 12345), an alphanumeric code (e.g., ABC123), etc.), a television device's IP address, a timestamp, and time to live. In one embodiment, in block 960, it is determined if the mobile device is already connected to the local network of the television device.

If it is determined that the mobile electronic device is already connected to the network, process 900 continues to block 980; otherwise, process 900 continues to block 970. In block 970, the network SSID and network key are used to connect to the network. In block 980, once the mobile electronic device is connected to the television application, the mobile electronic device uses the television device's IP address to send an application CONNECT message to the television application desired to be connected with. In process block 990, process 900 then stops.

Figure 9:
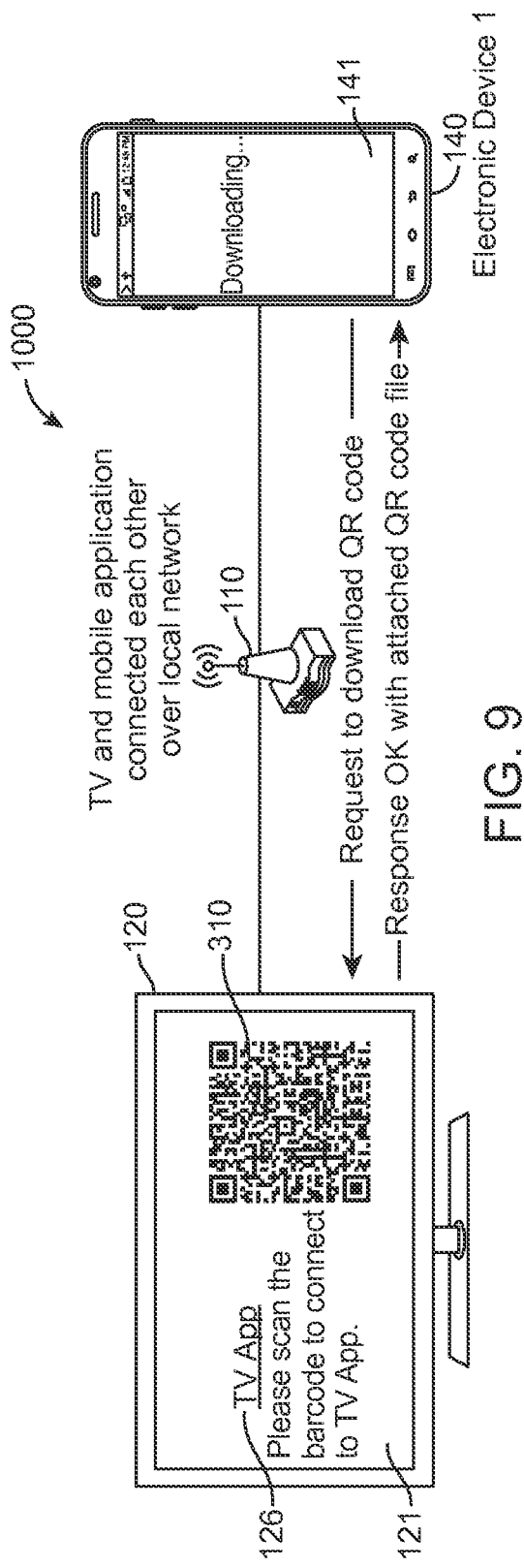
FIG. 9 shows an example scenario for application connection in a network, according to an embodiment.

FIG. 9 shows an example scenario 1000 for downloading a QR code 310 from the television device 120 to the electronic device 1 140 in a network of the television device 120, according to an embodiment. In one embodiment, the network connection 110 provides signals for the television device 120 to connect with a local network, either wirelessly (e.g., via Wi-Fi) or wired (e.g., via Ethernet). On the display 121, an application 1 126 is shown as launched and executing on the television device 120. A QR code 310 is displayed on the display 121, where the QR code 310 is generated from a process (e.g., process 200 of FIG. 2) for embedding information for connection to the application 1 126 in the local network to which the television device 120 is currently connected. Once the electronic device 1 140 is connected to the television device 120, the electronic device 1 140 requests to download the QR code 310 from the television 120. Once the download is complete, the electronic device 1 140 is then capable of displaying the QR code 310 on a display 141.

Figure 10:
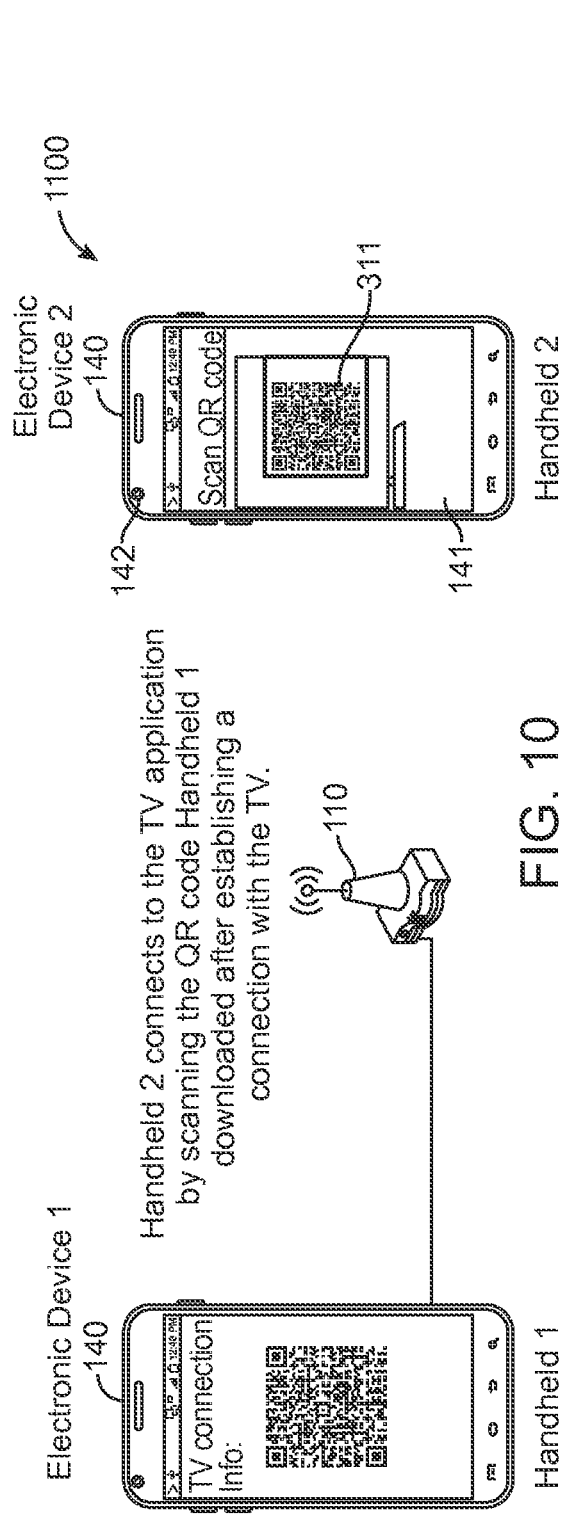
FIG. 10 shows another example scenario for application connection in a network, according to an embodiment.

FIG. 10 shows an example scenario 1100 for using a downloaded QR code 310 from the television device 120 by the electronic device 1 140 in a network of the television device 120, according to an embodiment. In one embodiment, a downloaded QR code 310 is displayed on the display 141 of electronic device 1 140. In one embodiment, other electronic devices 1-N 140 may then capture the QR code 310 from the electronic device 1 140 for connecting to the application 1 126. In one embodiment, once the electronic device 2 140 uses an application on the electronic device 2 140 to capture the QR code 310 as a QR code image 311 by using the camera 142. The electronic device 2 140 may then use the QR code image 311 to connect to the television 120 application 1 126 using the information extracted from the QR code image 311 of the QR code 310.

Figure 11:
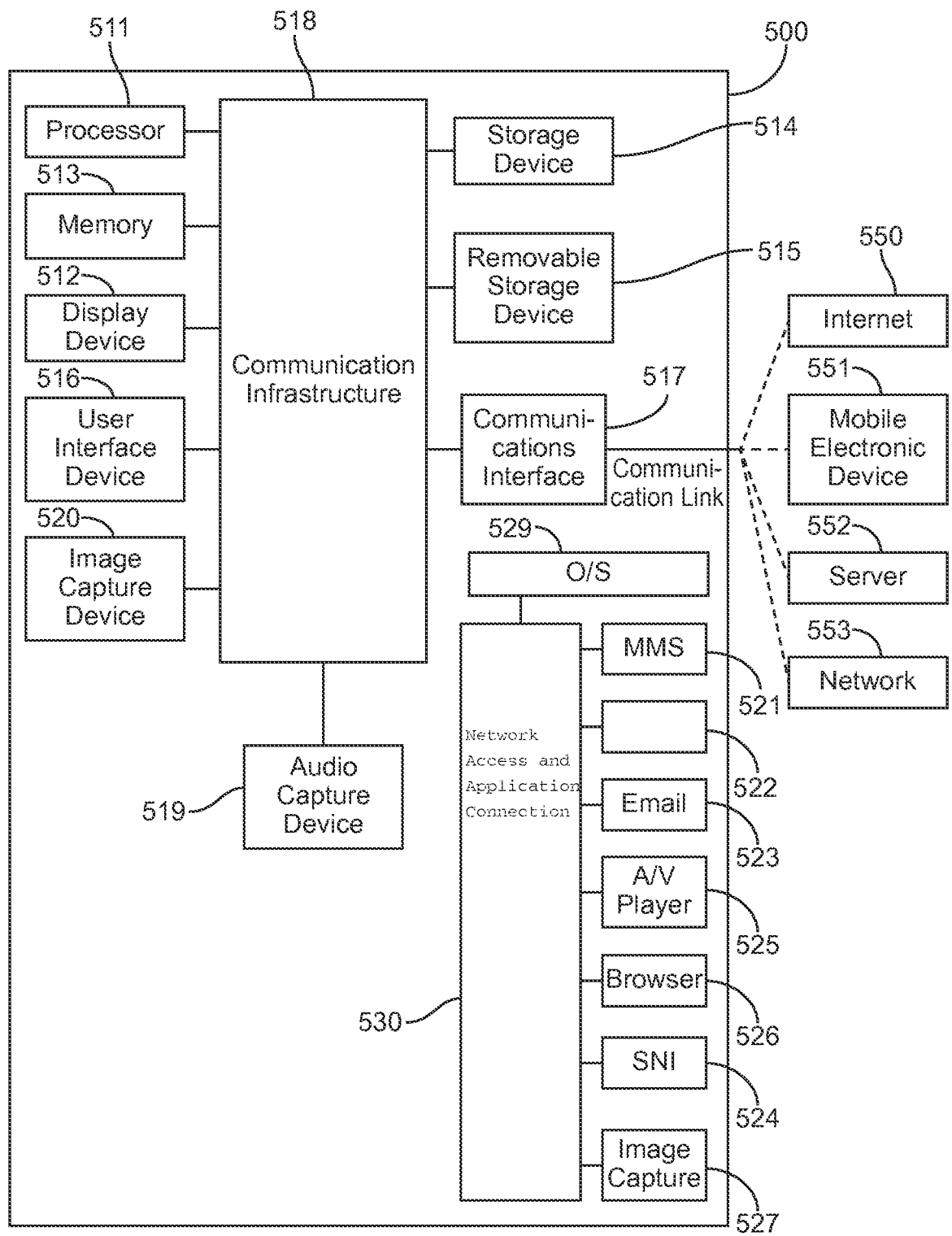
FIG. 11 is a high-level block diagram showing an information processing system comprising a computing system implementing an embodiment.

FIG. 11 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card). The communication interface 517 allows software and data to be transferred between the computer system and external devices. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals to/from a plurality of sinks/sources, such as, the Internet 550, a mobile electronic device 551, a server 552, or a network 553, and may be implemented using wire or cable, fiber optics, a phone line, a cellular phone link, an radio frequency (RF) link, and/or other communication channels.

In one implementation in a mobile wireless device such as a mobile phone, the system 500 further includes an image capture device such as a camera 520. The system 500 may further include application modules as MMS module 521, SMS module 522, email module 523, social network interface (SNI) module 524, audio/video (AV) player 525, web browser 526, image capture module 527, etc.

The system 500 further includes a network access and application connection module 530 as described herein, according to an embodiment. In one implementation of network access and application connection module 530 along with an operating system 529 may be implemented as executable code residing in a memory of the system 500. In another embodiment, such modules are in firmware, etc.

One or more of the described embodiments may provide a convenient way for many guests of a host that may desire access to a television device application on a wireless network in order to connect their handheld devices application with the television device application. In using one or more of the described embodiments, no need is required for network based discovery employing, for example, universal plug and play (UPnP) protocol as the IP address of a television device may be distributed as part of a QR code.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for application connection, comprising:
launching, on a second electronic device, a second application that extracts network information and device information;
using a symbolic code representing the network information and the device information to gain access, via the second electronic device, to: a network through a network interface device, a first electronic device connected to the network through the network interface device, and a first application already launched on the first electronic device, wherein the symbolic code and first application information are displayed on the first electronic device, the symbolic code includes application connection time limit information, and device connection status for the second electronic device is displayed on the first electronic device; and
connecting the second electronic device to the network through the network interface device, to the first electronic device and to the first application for a limited time based on the application connection time limit information.

2. The method of claim 1, wherein the network is a secured network.

3. The method of claim 2, wherein the symbolic code comprises:
wireless network information, a timestamp and the application connection time limit information when the first electronic device is connected wirelessly to the secured network; and
the wireless network information, the application connection time limit information, wired network information and the timestamp when the first electronic device is wire connected to the secured network.

4. The method of claim 3, wherein the symbolic code comprises a quick response (QR) code, the QR code includes the time stamp and the application connection time limit information, and usage of the QR code is restricted after the time stamp expires based on the application connection time limit information.

5. The method of claim 4, wherein:
the second application:
uses a camera of the second electronic device to obtain the QR code;
decrypts a string from the QR code for gaining access to the secured network and the first electronic device; and
connects to the first application by the second electronic device; and
the string is encrypted and is formed from the wireless network information, time stamp and access expiration.

6. The method of claim 5, further comprising:
disconnecting the second electronic device from the first application over the secured network based on the application connection time limit information and the timestamp.

7. The method of claim 5, further comprising:
displaying the QR code from the second electronic device for enabling a third electronic device to capture the QR code, access the network and connect to the first application.

8. The method of claim 7, wherein the first electronic device comprises a television device, the second electronic device and the third electronic device are each a mobile electronic device, a process displays the QR code on the television device, and the first application comprises a television app.

9. A method for application connection, comprising:
launching a first application on a second electronic device connected to a secured network;
generating identification content using the first application based on information obtained from network information and device information, the device information comprising application connection time limit information;
providing the identification content to a first electronic device already executing a second application; and
enabling, based on the identification content, the first electronic device to connect to the secured network through a network interface device, the second electronic device and the first application, wherein the identification content, first application information and device connection status for the first electronic device are displayed on the second electronic device.

10. The method of claim 9, wherein the identification content is a quick response (QR) code that comprises a device address in the secured network, a time stamp and the application connection time limit information, wherein usage of the QR code is restricted after the time stamp expires based on the application connection time limit information, and wherein the QR code is displayed on the second electronic device.

11. The method of claim 9, wherein the secured network is a secured local network.

12. The method of claim 11, further comprising:
disconnecting the first electronic device from the first application based upon one or more of: 1) an expiration of a time period determined by the time stamp and the application connection time limit information or 2) a distance between the first electronic device and the second electronic device.

13. The method of claim 12, wherein the second electronic device comprises a television device, the first electronic device comprises a mobile electronic device, a process provides the identification content from the second electronic device to the second application executing on the first electronic device, and the first application comprises a television app.

14. An electronic device comprising:
a camera device used by a first application to capture a symbol for identification content including network information and device information, the device information comprising application connection time limit information, and the symbol is displayed on a television device by a process launched on the television device, the television device being connected to a network through a network interface device; and
a processor configured to use the identification content to gain access to: the network through the network interface device, the television device and a second application already launched on the television device, wherein second application information and device connection status for the electronic device are displayed on the television device.

15. The electronic device of claim 14, wherein the electronic device is configured to execute the first application and to use the first application to obtain the identification content from the symbol.

16. The electronic device of claim 15, wherein the symbol is a quick response (QR) code that comprises a device address in the network, a time stamp and the application connection time limit information, and usage of the QR code is restricted after the time stamp expires based on the application connection time limit information.

17. The electronic device of claim 16, wherein access to the second application ends based on one or more of: 1) the application connection time limit information or 2) a distance from the electronic device to the television device.

18. The electronic device of claim 17, wherein the electronic device is a mobile electronic device, and the first application comprises a television app.

19. A non-transitory computer-readable medium embodied thereon instructions being executable by at least one processor to perform a method for application connection, the method comprising:
    launching a first application on a second electronic device connected to a secured network;
    generating, by a process executing on the second electronic device, identification content based on information obtained from network information and device information provided by the first application, the device information comprising application connection time limit information;
    providing the identification content from the process; and
    enabling, based on a second application on a first electronic device and based on the identification content, the first electronic device to connect to the secured network through a network interface device, the second electronic device and the first application, wherein the identification content, first application information and device connection status for the first electronic device are displayed on the second electronic device.

20. The non-transitory computer-readable medium of claim 19, wherein the identification content is a quick response (QR) code that comprises a unique identifier, a device address in the network, a time stamp and the application connection time limit information, wherein usage of the QR code is restricted after the time stamp expires based on the application connection time limit information, and wherein the QR code is displayed on the second electronic device.

21. The non-transitory computer-readable medium of claim 20, wherein the instructions are executable by the at least one processor to perform further operations comprising:
    disconnecting the first electronic device from the first application and the network based upon the obtained identification content.

22. The non-transitory computer-readable medium of claim 19, wherein the second electronic device is a television device, the first electronic device is a mobile electronic device, a process displays the identification content on the television device, and the first application comprises a television app.

23. The method of claim 2, wherein the secured network is a secure local network, and the network information includes a network security code.

24. The method of claim 9, wherein the network information includes a network security code.

25. The electronic device of claim 14, wherein the network is a secure local network, and the network information includes a network security code.

26. The non-transitory computer-readable medium of claim 19, wherein the secured network is a secure local network, and the network information includes a network security code.

* * * * *